United States Patent
Li

(10) Patent No.: US 9,823,165 B2
(45) Date of Patent: Nov. 21, 2017

(54) APPARATUS AND METHOD FOR MEASURING BACKLASH

(71) Applicant: Easy Link Mechanical Technology Company LTD., Taichung (TW)

(72) Inventor: Meng-Shing Li, Taichung (TW)

(73) Assignee: EASY LINK MECHANICAL TECHNOLOGY COMPANY LTD., Taichung (TW)

( * ) Notice: Subject to any disclaimer, the term of this patent is extended or adjusted under 35 U.S.C. 154(b) by 146 days.

(21) Appl. No.: 15/003,168

(22) Filed: Jan. 21, 2016

(65) Prior Publication Data
US 2017/0212007 A1    Jul. 27, 2017

(51) Int. Cl.
G01M 13/02    (2006.01)

(52) U.S. Cl.
CPC .................................. *G01M 13/021* (2013.01)

(58) Field of Classification Search
None
See application file for complete search history.

(56) References Cited

U.S. PATENT DOCUMENTS

| | | | | |
|---|---|---|---|---|
| 5,967,940 A | * | 10/1999 | Yamaguchi | B60K 6/24 477/107 |
| 2009/0320613 A1 | * | 12/2009 | Uehira | B62D 6/10 73/862.333 |
| 2013/0047801 A1 | * | 2/2013 | Ostein | F01L 1/026 81/484 |
| 2014/0046614 A1 | * | 2/2014 | Pettersson | G01M 13/04 702/113 |
| 2014/0290084 A1 | * | 10/2014 | Revach | G01B 21/02 33/701 |
| 2015/0204804 A1 | * | 7/2015 | Kim | G01N 23/2073 250/391 |
| 2015/0260608 A1 | * | 9/2015 | Inamori | G01M 13/023 73/812 |
| 2017/0166251 A1 | * | 6/2017 | Shao | B62D 6/10 |

* cited by examiner

*Primary Examiner* — Andre Allen

(57) ABSTRACT

A method for measuring the backlash of a gear train includes the steps of providing a gear train with an input end and an output end, spinning the input end of the gear train while loading the output end of the gear train with torque, and executing at least one round of measurement. The round of measurement includes the steps of measuring the rotational speed and/or angular position of the input end of the gear train and providing a first signal, measuring the rotational speed and/or angular position of the output end of the gear train and providing a second signal, and comparing the first and second signals with each other.

19 Claims, 8 Drawing Sheets

APPARATUS AND METHOD FOR MEASURING BACKLASH

BACKGROUND OF INVENTION

1. Field of Invention

The present invention relates to the backlash between two gears engaged with each other and, more particularly, to an apparatus and method for measuring the backlash between two gears engaged with each other.

2. Related Prior Art

A gear reducer includes gears engaged with one another between an input end and an output end. The gears can be arranged as a planetary gear train for example. The gears are made with various numbers of teeth. A high speed at the input end is converted to a low speed at the output end. The ratio of the speed at the output end over the speed at the input end is the gear ratio of the gear reducer. There is a clearance between any two gears engaged with each other and this gap is referred to as the "backlash." The backlash reflects the precision of the gears and is an important parameter considered in the quality control over the gears.

The backlash of the gears of a gear reducer is measured manually most of the time. The gear reducer is held in position on a table by a clamp before the backlash is measured manually with a measuring instrument.

The measuring instrument can be a micrometer that includes a circular scale and an indicator. The unit used in the circular scale is 1° that is too large for precise measurement. Moreover, the observation of the indicator against the circular scale is vulnerable to errors.

The measuring instrument can be a photosensitive coupling device (or "charge-coupled device", abbreviated as "CCD") that detects light and converts images to digital signals. However, the detection of light is vulnerable to errors. Hence, the precision of measurement is often low.

Taiwanese Patent Application Publication No. 201541064 discloses a method and apparatus for measuring a gear reducer. The apparatus includes a worktable 11, a positioning unit, a rotating unit 3 an operation interface 17. A gear reducer 2 is inserted in a cavity 12 made in the worktable 11. A clamp 13 is used for holding the gear reducer 2 in the cavity 12. Under the control of the operation interface 17, the positioning unit is connected to a first axle 22 of the gear reducer 2 to prevent the first axle 22 from rotation, and the rotating unit 3 is connected to a second axle 22 of the gear reducer 2 to spin the second axle 22 before the backlash of the gear reducer is measured. The measurement of backlash is however not precise because the first axle 22 is prevented from rotation by the positioning unit. Moreover, the teeth of the gears of the gear reducer are vulnerable to breakage.

The present invention is therefore intended to obviate or at least alleviate the problems encountered in prior art.

SUMMARY OF INVENTION

It is an objective of the present invention to provide a precise method for measuring the backlash of a gear reducer while the gear reducer is rotated in two opposite directions under a load.

To achieve the foregoing objective, the method includes the steps of providing a gear train with an input end and an output end, spinning the input end of the gear train while loading the output end of the gear train with torque, and executing at least one round of measurement. The round of measurement includes the steps of measuring the rotational speed and/or angular position of the input end of the gear train and providing a first signal, measuring the rotational speed and/or angular position of the output end of the gear train and providing a second signal, and comparing the first and second signals with each other.

It is another objective of the present invention to provide a precise apparatus for measuring the backlash of a gear reducer.

To achieve the foregoing objective, the apparatus includes a spinning unit, a loading unit, two encoders and a controller unit. The spinning unit is adapted to hold the input end of the gear train. The loading unit is adapted to hold the output end of the gear train. The first encoder is adapted to measure the spinning unit and provide a first signal representing the rotational speed and/or angular position of the input end of the gear train. The second encoder is adapted to measure the loading unit and provide a second signal representing the rotational speed and/or angular position of the output end of the gear train. The controller unit includes a processor unit adapted to receive, calculate and compare the first and signals with each other.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
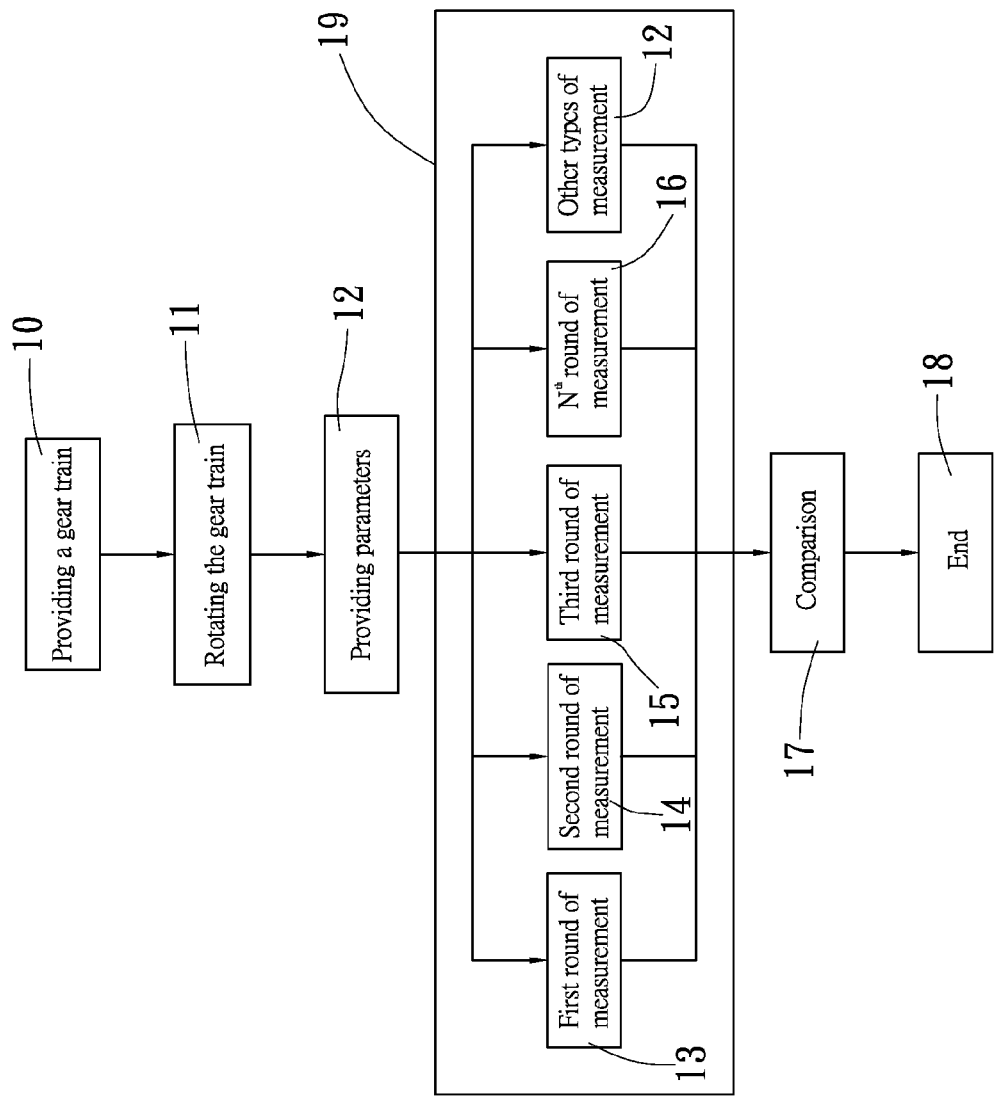
FIG. 1 is a flow chart of a method for measuring the backlash of a gear reducer according to the preferred embodiment of the present invention.

Referring to FIG. 1, there is a method for measuring the backlash of a gear train 40 (FIG. 8) according to the preferred embodiment of the present invention.

Figure 8:
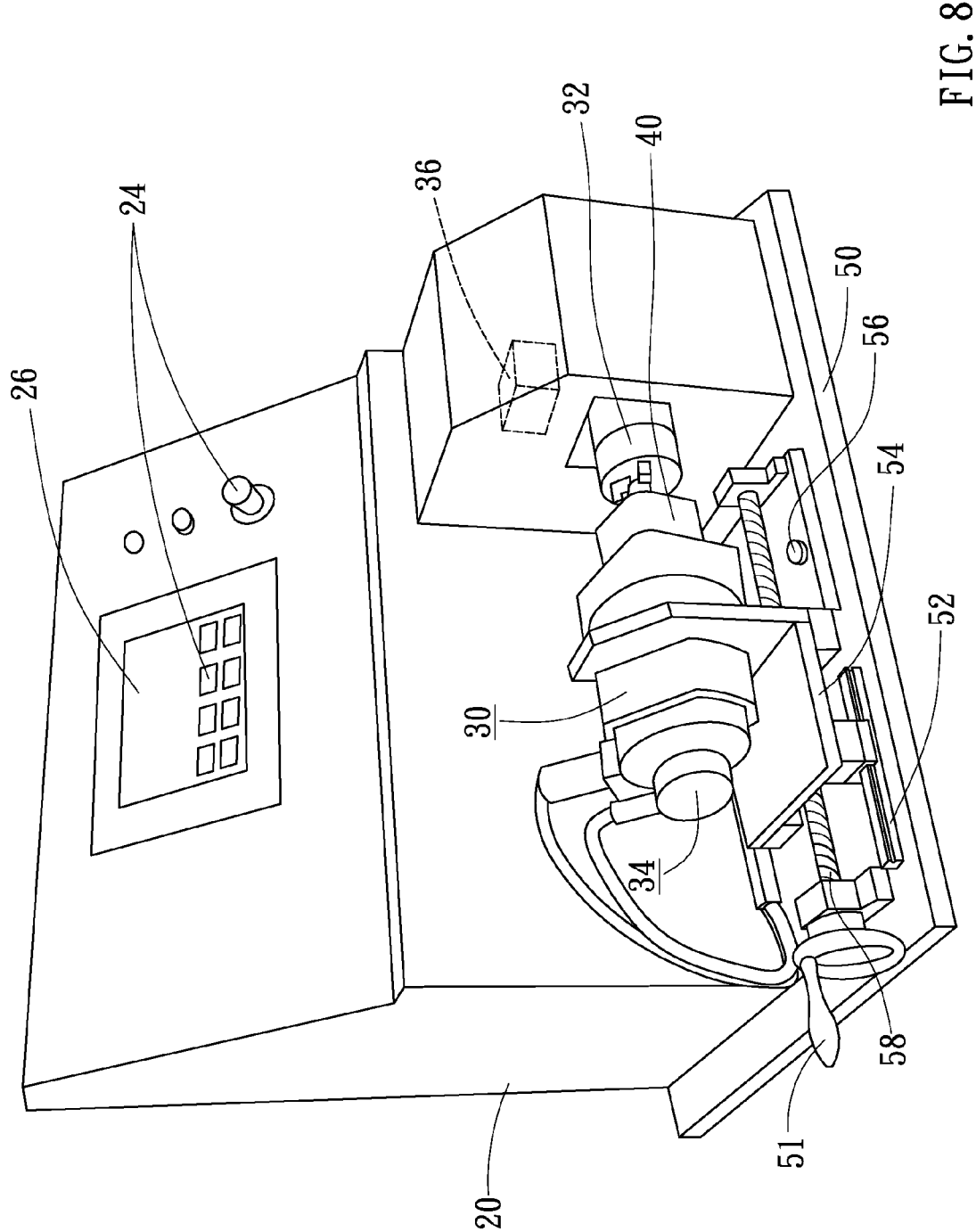
FIG. 8 is a perspective view of the apparatus shown in FIG. 2.

Referring to FIG. 8, there is a measuring apparatus for executing the method shown in FIG. 1. The measuring apparatus includes a controller unit 20, a spinning unit 30, a loading unit 32, a worktable 50, a derrick wheel 51, two tracks 52, a carrier 54, a temperature sensor 56, and a translation element 58. The controller unit 20, the spinning unit 30, the loading unit 32, the derrick wheel 51, the tracks 52, the carrier 54, the temperature sensor 56 and the translation element 58 are supported on the worktable 50.

The tracks 52 extend parallel to each other. The carrier 54 is movable on and along the tracks 52. The translation element 58 extends between and parallel to the tracks 52. The translation element 58 is preferably a threaded rod inserted in a screw hole made in a lower portion of the carrier 54 so that rotation of the former causes movement of the latter toward and from the loading unit 32. The derrick wheel 51 is connected to an end of the translation element 58 so that the former is operable to spin the latter. The temperature sensor 56 is located near another end of the translation element 58.

The spinning unit 30 preferably includes a chuck (not shown) operatively connected to a servomotor (not numbered). The spinning unit 30 is supported on the carrier 54 so that they are movable together with each other. The spinning unit 30 is electrically connected to the controller unit 20. A first encoder 34 is supported on the carrier 54, near the spinning unit 30. The first encoder 34 measures the spinning unit 30 and accordingly provides a first signal to the controller unit 20. More particularly, the first encoder 34 measures the chuck or servomotor of the spinning unit 30. More particularly, the first encoder 34 measures the servomotor of the spinning unit 30.

The loading unit 32 preferably includes a chuck (not numbered) operatively connected to a servomotor (not numbered). The chuck faces the carrier 54 and can spin relative to the loading unit 32. A second encoder 36 is located near the servomotor of the loading unit 32. The second encoder 36 measures the loading unit 32 and accordingly provides a second signal to the controller unit 20. More particularly, the second encoder 36 measures the chuck or servomotor of the loading unit 32. More particularly, the second encoder 36 measures the servomotor of the loading unit 32.

The loading unit 32 includes a chuck connected to a spinning unit in the preferred embodiment. However, the loading unit 32 can include a braking belt assembly (not shown) in an alternative embodiment.

Figure 2:
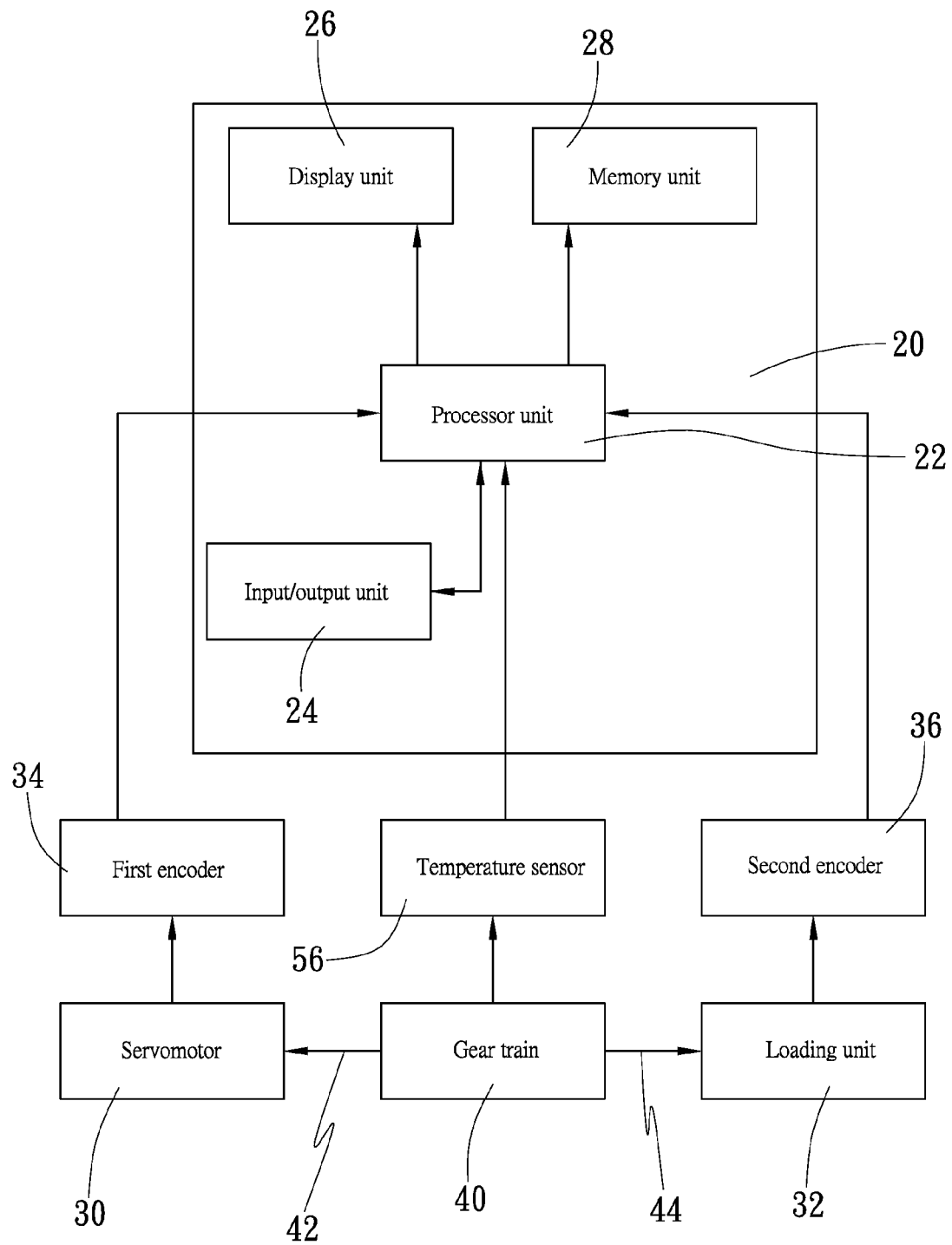
FIG. 2 is a block diagram of an apparatus for executing the method shown in FIG. 1.

With reference to FIG. 2, the controller unit 20 includes a processor unit 22, an input/output unit 24, a display unit 26 and a memory unit 28. The processor unit 22 is electrically connected to the input/output unit 24, the display unit 26 and the memory unit 28. The input/output unit 24 includes at least one knob, conventional button, touch-panel button or any proper element.

The processor unit 22 is electrically connected to the temperature sensor 56, the spinning unit 30, the loading unit 32, the first encoder 34 and the second encoder 36. In operation, the processor unit 22 receives, calculates and compares the first and second signals with each other. The display unit 26 shows the results of the comparison. The memory unit 28 receives data from the processor unit 22, stores the data and transfers the data.

Referring to FIG. 1 again, at 10, a gear train 40 (FIG. 8) is provided. For example, the gear train 40 is a gear reducer including an input end 42 and an output end 44. The gear train 40 includes gears engaged with one another (not shown). The gears can be arranged as a planetary gear train for transferring rotation to the output end 44 from the input end 42.

At 11, the input end 42 of the gear train 40 is connected to the chuck of the spinning unit 30 of the measuring apparatus so that they are rotatable together. That is, the spinning of the input end 42 of the gear train 40 is identical to the spinning of the chuck and servomotor of the spinning unit 30. The output end 44 of the gear train 40 is connected to the chuck of the loading unit 32 of the measuring apparatus so that they are rotatable together. That is, the spinning of the output end 44 of the gear train 40 is identical to the spinning of the chuck and servomotor of the loading unit 32.

At 12, based on the specification of the gear train 40, parameters such as rotational direction, rotational speed, torque, period of time and reduction ratio are set and/or adjusted via the input/output unit 24.

Figure 3:
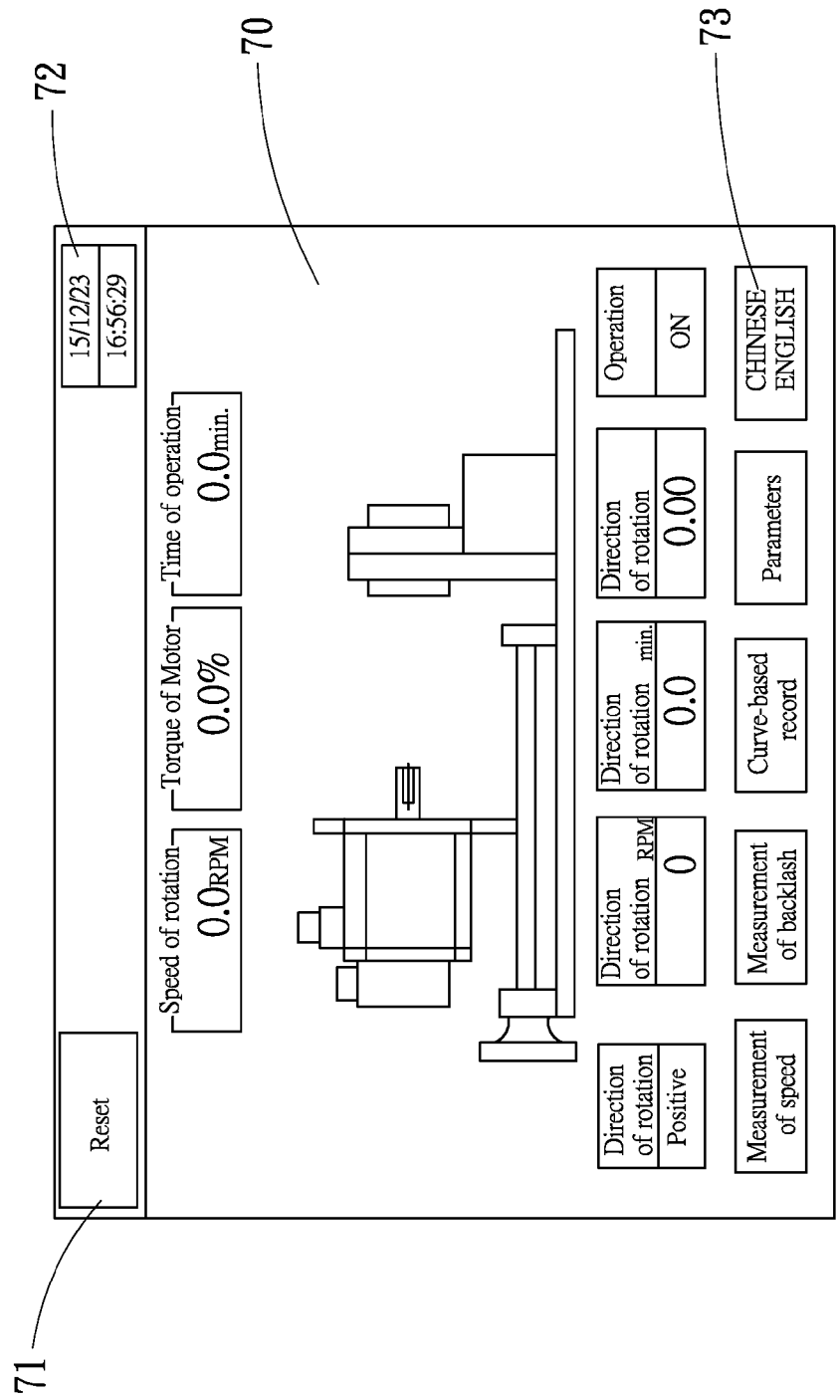
FIGS. 3 to 7 show images shown on a display of the apparatus shown in FIG. 2 in various steps of the method shown in FIG. 1.

In particular, the display unit 26 provides a screen 70 as shown in FIG. 3. The screen 70 includes an image representing the spinning unit 30 and the loading unit 32 in the middle, a trouble-shooting button 71 and a timetable 72 in an upper portion, and touch-panel buttons 73 in a lower portion. The touch-panel buttons are operable for selecting "ROTATIONAL SPEED", "BACKLASH", "RECORD", "SET", "ROTATIONAL DIRECTION" and "ACTIVATE."

Figure 4:
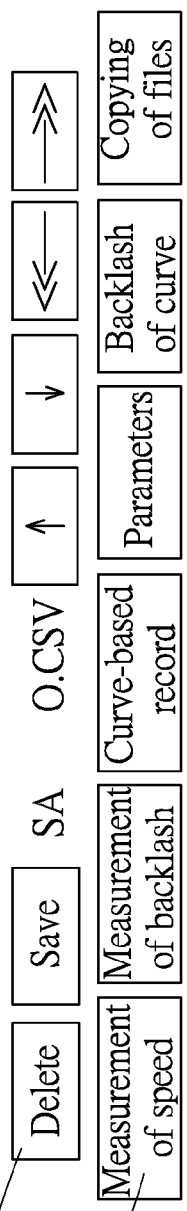

Referring to FIG. 4, the screen 70 includes a table for recording data related to the backlash. The touch-panel buttons 73 of the screen 70 includes buttons for "UPWARD", "DOWNWARD", "TO THE LEFT", "TO THE RIGHT" and "DELETE."

Figure 5:
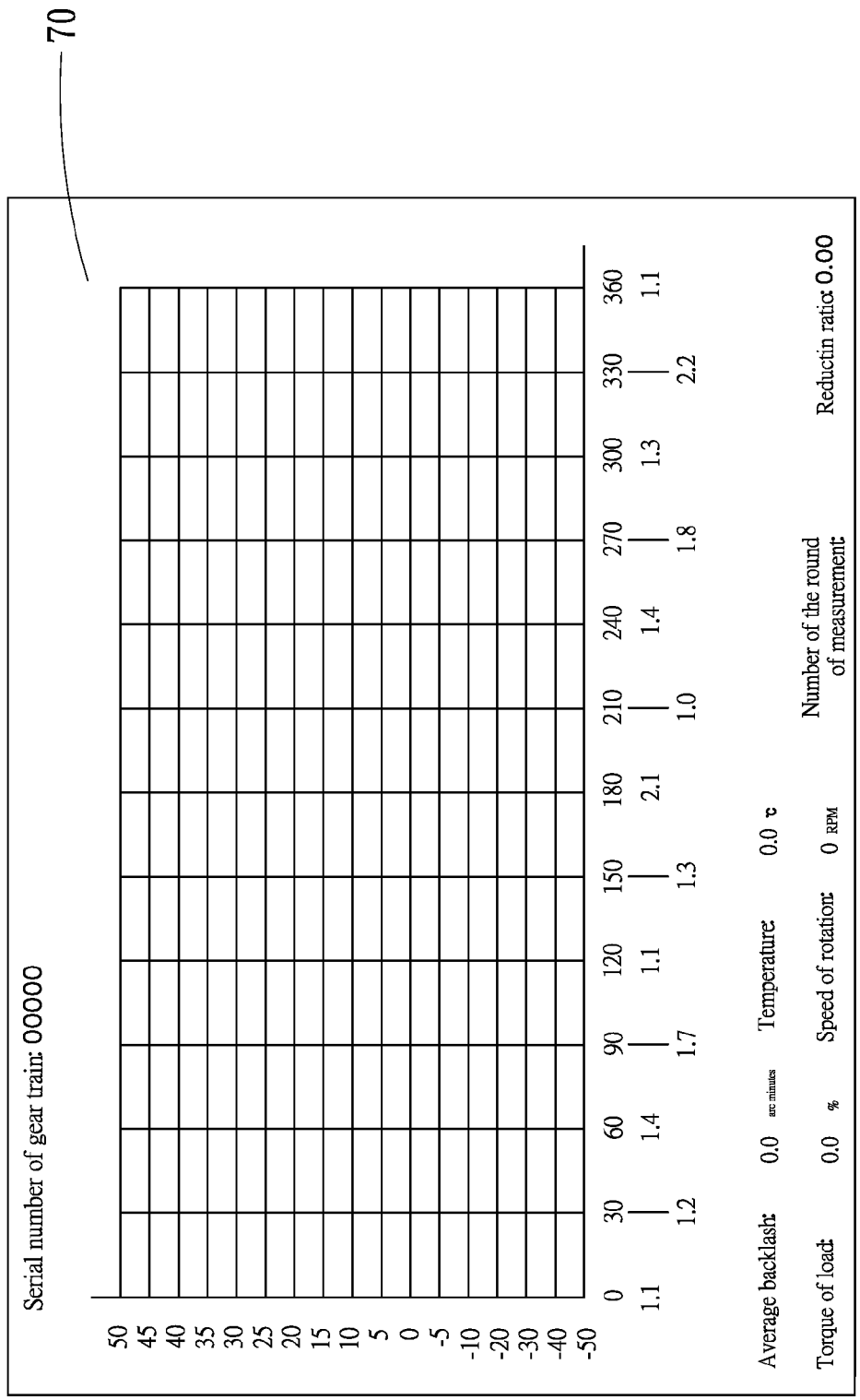

Referring to FIG. 5, the screen 70 includes a blank chart for showing data related to the average backlash in arc minute, the serial number or recordation, the temperature, the load, the rotational speed, the number of laps and the serial number or recordation, temperature, load, rotational speed, number of turns and reduction ratio. A degree ("1°") includes sixty arc minutes ("60'").

Figure 6:
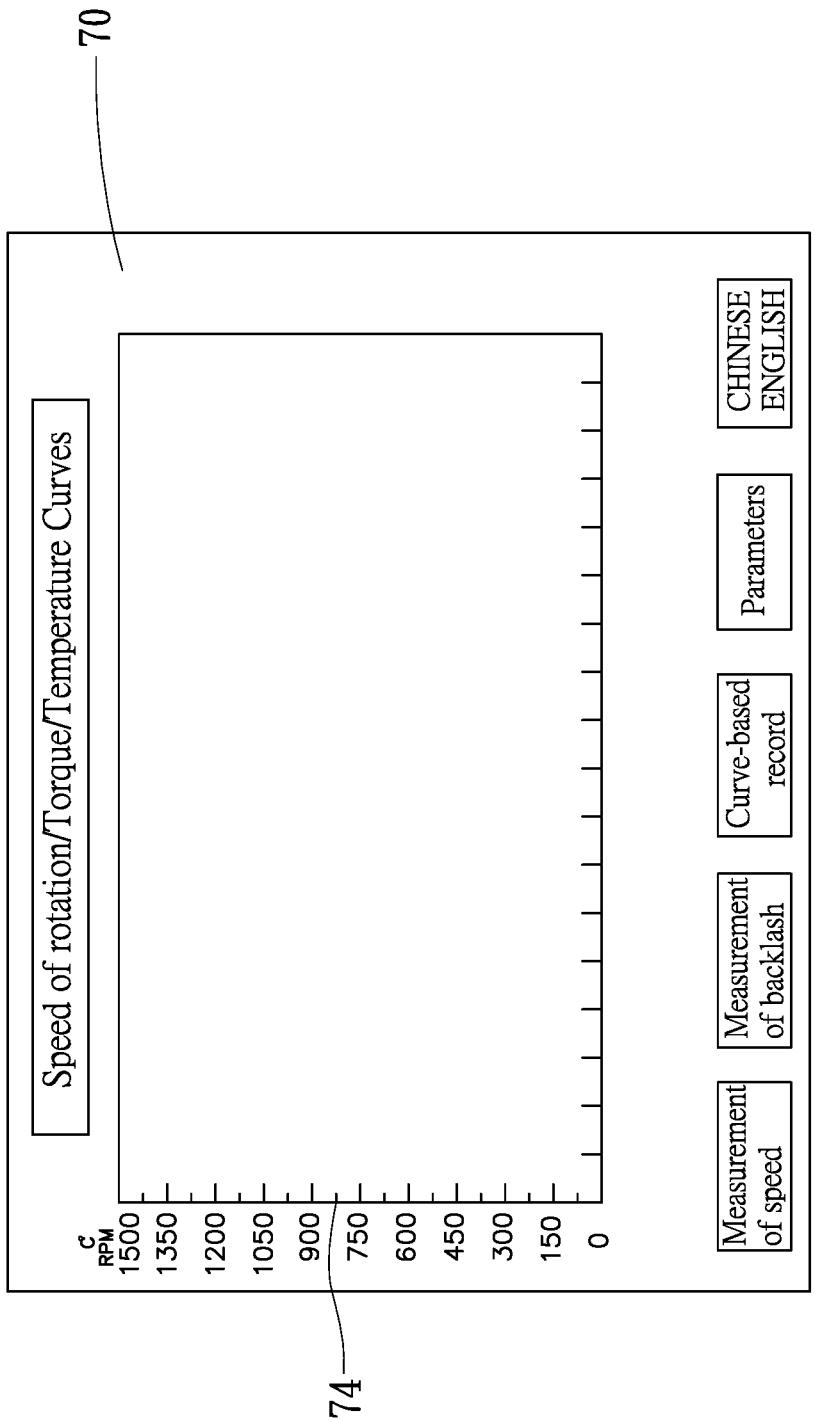

Referring to FIG. 6, the screen 70 includes a blank rectangular frame. In a left portion of the frame, there is a scale 74 for "ROTATIONAL SPEED", "TORQUE" OR "TEMPERATURE." In a lower portion of the frame, there is another scale 74 for time (the unit is "second"). Thus, the ratio of change of the rotational speed, torque or temperature can be shown.

Figure 7:
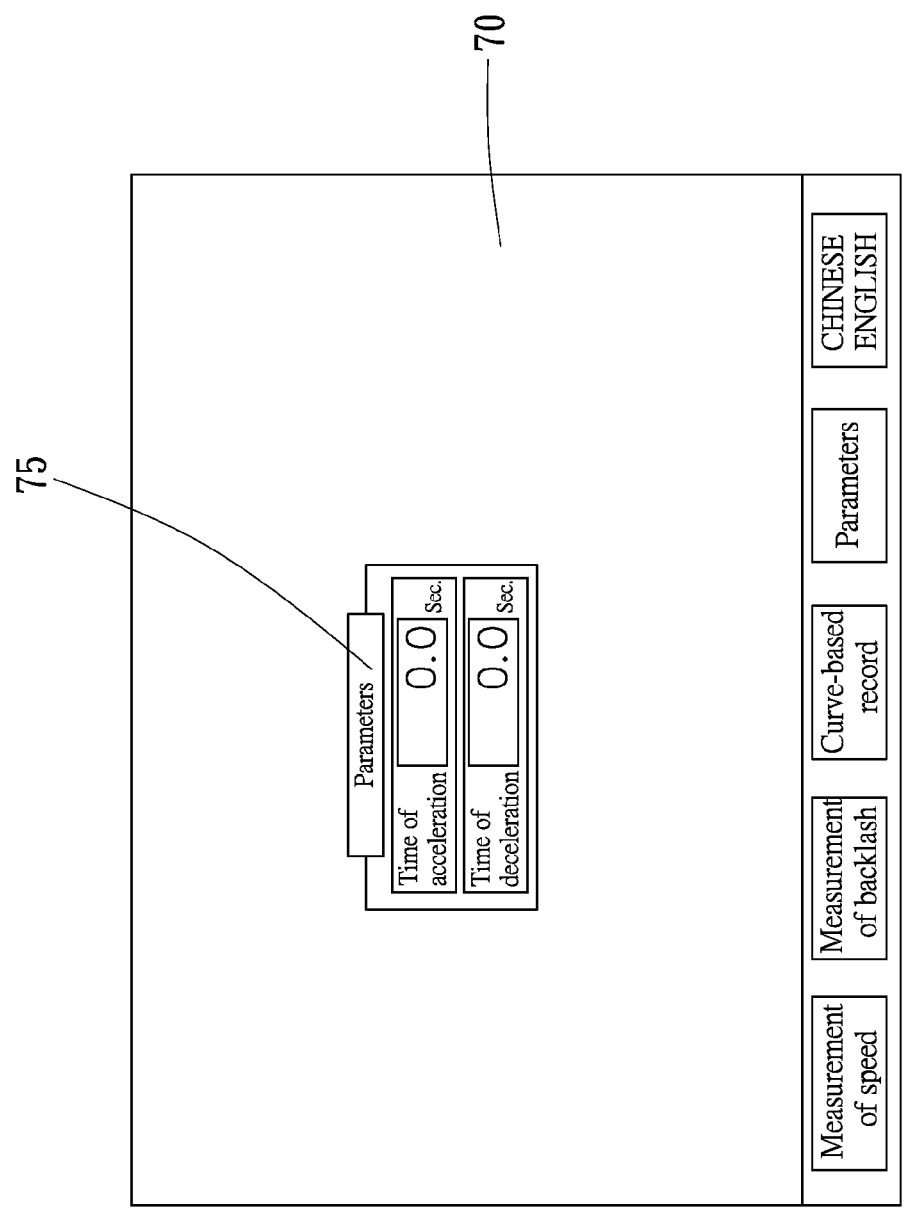

Referring to FIG. 7, the screen 70 includes parameter columns 75 for parameters such as periods of time of acceleration and deceleration. Thus, the backlash can be measured.

Referring to FIGS. 1, 2 and 8, at 19, the backlash is measured. The first encoder 34 measures the rotational speed and/or angular position of the input end 42 of the gear train 40 via the spinning unit 30 and accordingly provides the first signal. The second encoder 36 measures the rotational speed and/or angular position of the output end 44 of the gear train 40 via the loading unit 32 and accordingly provides the second signal. The measurement of the backlash at 19 sequentially includes a first round of measurement at 13, a second round of measurement at 14, a third round of measurement at 15, an $N^{th}$ round of measurement at 16 and another type of measurement at 21.

A revolution (360°) of the spinning unit 30 is evenly divided into angles, thus providing angular positions. The angular position of the spinning unit 30 at the beginning in the first round of measurement at 13 is considered a start point (the "first angular position"). For example, a revolution (360°) of the spinning unit 30 is evenly divided into 12 angles each being 30°. Thus, the first angular position is 0°.

In the first round of measurement at 13, one of the first encoder 34 and 36 measures the spinning unit 30 and accordingly provides the first signal. The second encoder 36 measures the loading unit 32 and accordingly provides the second signal. The spinning unit 30 can be set to spin clockwise or counterclockwise for a revolution or more.

That is, the spinning unit 30 spins the gear train 40 while the loading unit 32 exerts a load on the gear train 40. Now, the first encoder 34 measures the spinning unit 30 and sends the first signal to the processor unit 22 of the controller unit 20. Moreover, the second encoder 36 measures the loading unit 32 and sends the second signal to the processor unit 22 of the controller unit 20). The processor unit 22 of the controller unit 20 receives, calculates and compares the signals with each other. The results of the comparison are shown on the display unit 26 and stored in the memory unit 28. The backslash is precisely measured.

In the second round of measurement at 14, the spinning unit 30 spins to the second angular position (30°). The tasks executed in the first round of measurement are repeated in the second round of measurement. That is, the first and second signals are provided again.

In the third round of measurement at 15, the spinning unit 30 spins to the third angular position (60°). The tasks executed in the first round of measurement are repeated in the third round of measurement. That is, the first and second signals are provided again.

In the $N^{th}$ round of measurement at 16, the spinning unit 30 spins to the $N^{th}$ angular position (30°×(N−1)). The tasks executed in the first round of measurement are repeated in the $N^{th}$ round of measurement. That is, the first and second signals are provided again.

In the other type of measurement at 12, the spinning unit 30 spins the gear train 40 at high speed for a period of time before the temperature sensor 56 measures and records the temperature of the gear train 40. Then, the spinning unit 30 spins the gear train 40 at low speed, and the first and second signals are provided again.

At 17, the first and second signals are compared with each other. The processor unit 22 of the controller unit 20 receives and calculates the first and second signals to provide an average value. Hence, the measurement of the backlash is precise.

At 18, the results of the comparison are shown. The results of the rounds of comparison are shown on display unit 26, in numbers in a table or bars or a curve in a chart. Hence, the backlash is clearly shown.

As discussed above, the measurement of the input end 42 of the gear train 40 is precise because the spinning of the input end 42 of the gear train 40 is identical to the spinning of the servomotor of the spinning unit 30 and the measurement of the servomotor of the spinning unit 30 is precise. The measurement of the output end 44 of the gear train 40 is precise because the spinning of the output end 44 of the gear train 40 is identical to the spinning of the servomotor of the loading unit 32 and the measurement of the servomotor of the loading unit 32 is precise. Hence, the measurement of the backlash of the gear train 40 is precise.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for measuring the backlash of a gear train, comprising the steps of:
   providing a gear train with an input end and an output end;
   spinning the input end of the gear train while loading the output end of the gear train with torque;
   executing at least one round of measurement comprising the steps of:
      measuring the rotational speed and/or angular position of the input end of the gear train and providing a first signal;
      measuring the rotational speed and/or angular position of the output end of the gear train and providing a second signal; and
      comparing the first and second signals with each other.

2. The method according to claim 1, further comprising the step of showing the results of the comparison.

3. The method according to claim 2, wherein the step of showing the results of the comparison comprises the step of showing the results of the comparison in at least one form selected from the group consisting of numbers, charts and tables.

4. The method according to claim 1, wherein the step of spinning the output end of the gear train comprises the step of spinning the output end of the gear train for at least one revolution.

5. The method according to claim 1, wherein the step of executing at least one round of measurement of the backlash of the gear train comprises the steps of:
   evenly dividing a revolution of the spinning unit to several angles to provide several angular positions; and
   executing a next round of measurement of the backlash of the gear train after spinning the spinning unit to a next one of the angular positions.

6. An apparatus for executing the method according to claim 1, comprising:
   a spinning unit adapted to hold the input end of the gear train;
   a loading unit adapted to hold the output end of the gear train;
   a first encoder adapted to measure the spinning unit and provide a first signal representing the rotational speed and/or angular position of the input end of the gear train;
   a second encoder adapted to measure the loading unit and provide a second signal representing the rotational speed and/or angular position of the output end of the gear train; and
   a controller unit comprising a processor unit adapted to receive, calculate and compare the first and signals with each other.

7. The apparatus according to claim 6, wherein the controller unit further comprises a display unit adapted to show the results of the comparison on the display unit.

8. The apparatus according to claim 6, wherein the controller unit further comprises a memory unit adapted to store the results of the comparison.

9. The apparatus according to claim 6, wherein the controller unit further comprises an input/output unit electrically connected to the processor unit.

10. The apparatus according to claim 6, further comprising a temperature sensor electrically connected to the processor unit and adapted to measure the temperature of the gear train.

11. The apparatus according to claim 6, wherein the loading unit comprises a chuck adapted to hold the output end of the gear train.

12. The apparatus according to claim 6, wherein the loading unit is selected from the group consisting of a servomotor and a braking belt.

13. The apparatus according to claim 6, further comprising a worktable for supporting the spinning unit, the loading unit, the first and second encoders and the controller unit.

14. The apparatus according to claim 13, further comprising a carrier movably supported on the worktable, wherein the spinning unit is supported on the carrier.

15. The apparatus according to claim 14, further comprising two parallel tracks for movably supporting the carrier.

16. The apparatus according to claim 15, further comprising a translation element extending between and parallel to the tracks, wherein the translation element is connected to the carrier to move the carrier toward and from the loading unit.

17. The apparatus according to claim 16, wherein the translation element comprises a threaded rod engaged with a threaded portion of the carrier.

18. The apparatus according to claim 14, further comprising a translation element connected to the carrier to move the carrier toward and from the loading unit.

19. The apparatus according to claim 18, wherein the translation element comprises a threaded rod engaged with a threaded portion of the carrier.

* * * * *